United States Patent
Materne et al.

(10) Patent No.: US 6,225,397 B1
(45) Date of Patent: May 1, 2001

(54) RUBBER COMPOSITION CONTAINING SILICA HAVING FIRST AND SECOND AGGREGATES EACH CONTAINING DIFFERENT PARTICLE SIZES

(75) Inventors: Thierry Florent Edme Materne, Akron, OH (US); Giorgio Agostini, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/255,067

(22) Filed: Feb. 22, 1999

Related U.S. Application Data

(60) Provisional application No. 60/077,429, filed on Mar. 9, 1998.

(51) Int. Cl.[7] .............................. C08K 3/36; C08K 3/34; B60C 11/00

(52) U.S. Cl. ..................... 524/493; 524/492; 524/262; 152/209.1

(58) Field of Search .................................. 524/493, 492, 524/262

(56) References Cited

U.S. PATENT DOCUMENTS 5,753,732 * 5/1998 Wideman et al. ................. 525/332.6

OTHER PUBLICATIONS

"Influence of Precipitated Silica Characteristics on the Properties of a Truck Tyre Tread, II" by Y. Bomal et al. *KGK Kautschuk Gummi Kunststoffe*, vol. 51, No. 4 Published Apr. 1998, pp. 259–267.

"Reinforcement of EPDM–based ionic Thermoplastic elastomer by precipitated silica filler" by S. Datta et al. *Polymer,* vol. 37, No. 17, Published 1996, pp. 2581–2585.

"Die Einwirking gefällter Kieselsäure auf die Messing/Gummi–Hafting" by L. R. Evans et al. *Gawk Gummi Fares Kunststoffe 2,* vol. 49, No. 1, Published 1996.

"Ultra–High reinforcing Precipitated Silica for Tire and rubber Applications" by L. R. Evans, et al. *KGK Kautschuk Gummi Kunststoffe,* vol. 48, No. 10, Published Oct. 1995, pp. 718–723.

"The Unique Properties of Precipitated Silica in the Design of High Performance Rubber" by M. Q. Fetterman, *Elastomerics* Published Sept. 1984, pp. 18–31.

European Patent Search Report.

* cited by examiner

*Primary Examiner*—James J. Seidleck
*Assistant Examiner*—Olga Asinovsky
(74) *Attorney, Agent, or Firm*—Bruce J Hendricks

(57) ABSTRACT

The present application relates to a rubber composition containing a precipitated silica filler having first and second aggregates. The first aggregates are from 10 to 90 weight percent of the overall weight of the silica having first and second aggregates. The second aggregates range from 90 to 10 weight percent of the overall weight of the silica having first and second aggregates. The first aggregates consist essentially of particles ranging in size of from 5 to 15 nanometers in diameter. The second aggregates consist essentially of particles ranging in size of from 17 to 30 nanometers in diameter. The pore size distribution of the silica, as measured by mercury porosimetry is monomodal.

25 Claims, 2 Drawing Sheets

US 6,225,397 B1

RUBBER COMPOSITION CONTAINING SILICA HAVING FIRST AND SECOND AGGREGATES EACH CONTAINING DIFFERENT PARTICLE SIZES

This application claims the benefit of U.S. Provisional Application 60/077,429 filed Mar. 9, 1998.

BACKGROUND OF THE INVENTION

Nanomaterials are particles having a size of from 1 to 30 nanometers in diameter. Use of nanomaterials have been known in rubber. For example, in U.S. Pat. No. 4,644,988, there is disclosed a tire tread compound containing a styrene-butadiene copolymer rubber reinforced with a high structure carbon black designated as N103 and a particle size smaller than 20 nanometers. In addition, it is known from U.S. Pat. No. 4,474,908 that siliceous fillers having an ultimate particle size in the range of from 15 to 30 nanometers have been used in rubber. One advantage in using such nanomaterials in rubber is to improve the treadwear. Unfortunately, upon mixing nanomaterials in a rubber composition, such nanomaterials tend to reagglomerate and, therefore, increase the individual particle sizes which result in decreasing the benefits for which they are added. In addition, with increasing levels of nanomaterials in place of larger particles (>100 nanometers in diameter), the rubber becomes more hysteretic.

Japanese Unexamined Patent 8-133720 discloses a production method of precipitated silica granulate involving (a) mixing 100 percent of precipitated silica powder, in which a mean particle size is more than 60 μm and a particle hardness is 10–30 g, with 5 to 30 percent of precipitated silica powder, in which a mean particle size is less than 20 μm, and (b) granulating.

SUMMARY OF THE INVENTION

The present invention relates to rubber compositions containing precipitated silica having two different aggregates each containing distinct particle sizes and where the pore size distribution of the silica, as measured by mercury porosimetry is monomodal.

DETAILED DESCRIPTION OF THE DRAWING

DETAILED DESCRIPTION OF THE INVENTION

Figure 1:
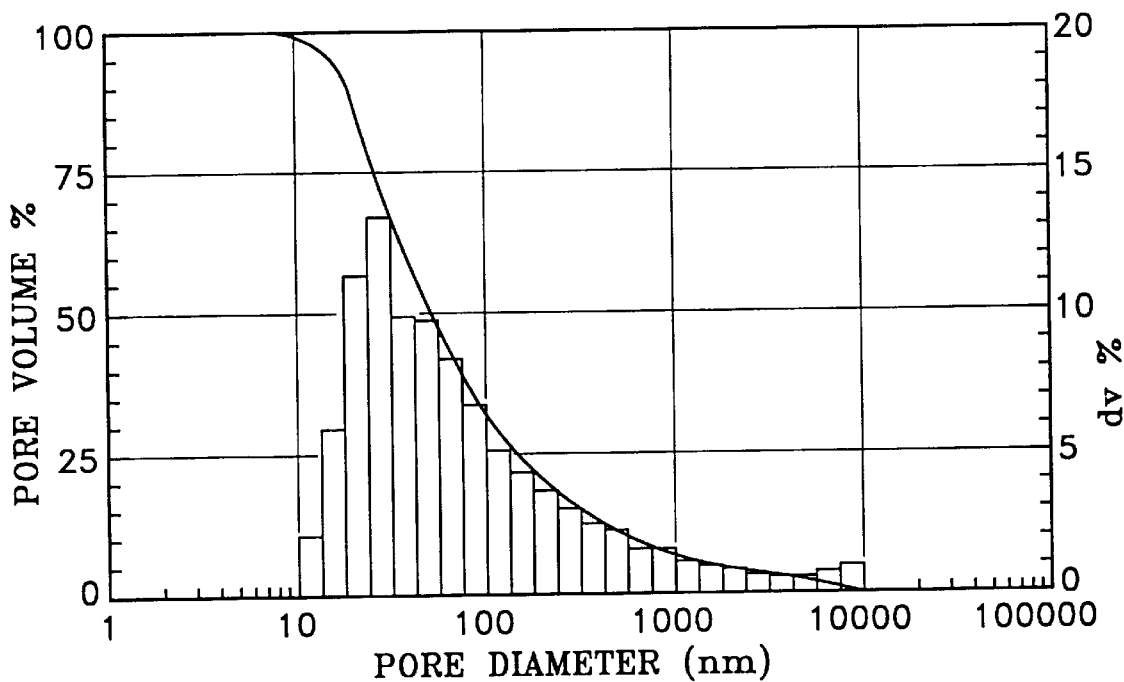
FIG. 1 is a graphical illustration of the pore volume percent and the mercury volume deviation in terms of percent for silica 4 used in Example 1.

There is disclosed a method of processing a rubber composition containing a filler comprising mixing
(a) 100 parts by weight of at least one rubber containing olefinic unsaturation; and
(b) 1 to 250 phr of a precipitated silica having first and second aggregates wherein
  (1) said first aggregates are from 10 to 90 weight percent of the overall weight percent of said silica and consist essentially of small particles ranging in size of from 5 to 15 nanometers in diameter;
  (2) said second aggregates are from 90 to 10 weight percent of the overall weight percent of said silica and consist essentially of small particles ranging in size of from 17 to 30 nanometers in diameter; and
  (3) the pore size distribution of the silica, as measured by mercury porosimetry is monomodal.

In addition, there is disclosed a rubber composition containing a filler comprising
(a) 100 parts by weight of at least one rubber containing olefinic unsaturation; and
(b) 1 to 250 phr of a precipitated silica having first and second aggregates wherein
  (1) said first aggregates are from 10 to 90 weight percent of the overall weight percent of said silica and consist essentially of small particles ranging in size of from 5 to 15 nanometers;
  (2) said second aggregates are from 90 to 10 weight percent of the overall weight percent of said silica and consist essentially of small particles ranging in size of from 17 to 30 nanometers in diameter; and
  (3) the pore size distribution of the silica, as measured by mercury porosimetry is monomodal.

The present invention may be used to process sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The term particles, also known as elementary particles is well known to those skilled in the art. Also known is the term aggregates which generally consist of a cluster of from 3 to 15 particles. Cluster of aggregates make up agglometerates and clusters of agglometers make up granulates.

The rubber composition should contain a sufficient amount of the precipitated silica filler having first and second aggregates to contribute a reasonably high modulus and high resistance to tear. The filler may be added in an amount ranging from 1 to 250 phr. Preferably, such filler is present in an amount ranging from 10 to 100 phr.

The silica for use in the present invention is characterized by first and second aggregates. The first aggregate consist essentially of individual particles having diameters ranging from about 5 to 15 nanometers in diameter. Preferably, the particles in the first aggregates range in size of from 10 to 15 nanometers in diameter. The second aggregates consist essentially of individual particles having diameters ranging from about 17 to 30 nanometers. Preferably, the particles in the second aggregates range in size of from 18 to 25 nanometers in diameter. The term "consist essentially of" is used herein to characterize the first or second aggregates having at least 70 percent by weight of the particles of the specified diameters. As known to those skilled in the art, the particle size diameters may be determined by TEM or electron microscopy.

The first aggregates range from 10 to 90 weight percent of the overall weight percent of silica having first and second aggregates. Preferably, the first aggregates range from 15 to 50 weight percent of the overall weight percent of silica having first and second aggregates.

The second aggregates range from 10 to 90 weight percent of the overall weight percent of silica having first and second aggregates. Preferably, the second aggregates range from 85 to 50 weight percent of the overall weight of silica having first and second aggregates.

The above-described particle diameters can be confirmed by a number of means, including electron microscope.

The precipitated siliceous fillers that can be used in the present invention include such highly dispersed silicas (silicon dioxide) having a BET surface area in the range of between 50 and 400 $m^2/g$ and preferably from 70 to 250 square meters per gram. The BET method of measuring surface area is described in the Journal of the American Chemical Society, Volume 60, page 304 (1930).

The precipitated siliceous fillers have a DOP oil absorption value of from 100 to 300 ml/100 g. Preferably, the precipitated siliceous fillers have a DOP oil absorption value of from 150 to 250 ml/100 g.

Such silica fillers can be produced, for example, by co-spraying. The manufacture of precipitated silica is well known. For example, synthetic precipitated silicas are prepared by admixing alkaline silicate solutions with acids; for example, sodium silicate with sulfuric acid. The solutions are stirred and the precipitated silica is filtered. The precipitated silica may be filtered in a rotary drum or filter press to yield a pumpable filter cake. Two different pumpable filter cakes are then blended and fluidized using dedicated additives, like $NaAlO_2$. The resulting mixture is co-sprayed using a plurality of nozzles to dry the silica. The co-sprayed silica can then be ground in a mill to impact the desired particle size.

The pore size distribution of the silica, as measured by mercury porosimetry and graphically depicted is monomodal.

Monomodal is used herein to mean a single peak in a graphical depiction. Mercury porosimetry records a volume variation of mercury in a measuring cell containing also silica as a function of the pressure applied. When the derivative of this curve in the region corresponding to pores of from 10 to 100 nm in diameter is a single peak, the pore size distribution is considered herein as "monomodal." If two peaks are graphically depicted, then the pore size distribution is considered bimodal. If three peaks are depicted, then such is trimodal.

Mercury surface area/porosity is the specific surface area determined by Mercury porosimetry. For such technique, mercury is penetrated into the pores of the sample after a thermal treatment to remove volatiles. Set-up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used.

The pore volumes reported are measured by mercury porosimetry. The pore diameters are calculated by the WASHBURN equation, employing an angle of contact theta equal to 141.3 and a surface tension gamma equal to 480 dynes/cm.

The average mercury porosity specific surface area for the silica should be in a range of about 50 to 300 m²/g.

A suitable pore-size distribution for the silica containing the first and second aggregates, according to such mercury porosity evaluation is considered herein to be 5 percent or less of its pores have a diameter of less than about 10 nm; 60 to 90 percent of its pores have a diameter of about 10 to about 100 nm; 10 to 40 percent of its pores have a diameter of about 100 to about 1000 nm; and 0 to 5 percent of its pores have a diameter of greater than about 1000 nm.

It is preferred to have the rubber composition additionally contain a conventional sulfur containing organosilicon compound. Examples of suitable sulfur containing organosilicon compounds are of the formula:

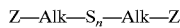

$$Z-Alk-S_n-Alk-Z \qquad (I)$$

in which Z is selected from the group consisting of

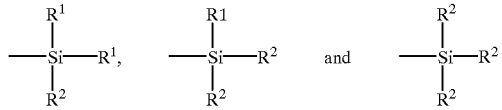

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis (methylbutylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis (triethoxysilylpropyl) disulfide and 3,3'-bis (triethoxysilylpropyl) tetrasulfide. Therefore as to formula I, preferably Z is

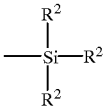

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of Formula I in a rubber composition will vary depending on the level of silica filler that is used. Generally speaking, the amount of the compound of formula I will range from 0.00 to 1.0 parts by weight per part by weight of the silica. Preferably, the amount will range from 0.00 to 0.4 parts by weight per part by weight of the silica.

In addition to the silica having first and second aggregates, each containing different particle sizes, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitate silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 $cm^3/100$ g.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and filler having first and second aggregates are mixed in one or more non-productive mix stages. The terms "non-productiven" and "productive" mix stages are well known to those having skill in the rubber mixing art. The rubber composition containing the filler having first and second aggregates as well as the sulfur-containing organosilicon compound, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

EXAMPLE 1

The present example was conducted to compare and contrast silicas for use in the present invention versus mechanical blends or mixtures and single-type silicas. The first control silica (Silica 1) that was compared was obtained from Rhone-Poulenc as Z1115MP. Silica 1 is a control because, even though it is monomodal (single number for PSD Max), the silica has only one type of aggregate with an elementary particle size of 20 nanometers. The second silica (Silica 2) was also obtained from Rhone Poulenc as RP240HD. Silica 2 is a control because, even through it is monomodal (single number for PSD Max), the silica has only one type of aggregate with an elementary particle size of 11 nanometer. The third silica (Silica 3) was a 50:50 (weight ratio) mechanical blend of Z1115MP and RP240HD. Silica 3 is a control because, even though it has a first aggregate with a particle size of 11 and a second aggregate with a particle size of 20, Silica 3 is bimodal. The silica (Silica 4) for use in the present invention was also obtained from Rhone Poulenc. Silica 4 has a first aggregate with a particle size of 11, a second aggregate with a particle size of 20 and is monomodal. Analytical data for each of these four silicas are listed in Table I below.

TABLE I

|  | Control Silica 1 | Control Silica 2 | Control Silica 3 | Silica 4 |
| --- | --- | --- | --- | --- |
| $N_2$ SSA ($m^2/g$) | 108 | 223 | 167.5 | 161 |
| Hg SSA ($m^2/g$) | 109 | 238 | 180 | 177 |
| V (Hg) ($cm^3/g$) | 1.76 | 1.65 | 1.8 | 1.8 |
| PSD Max (nm) | 55 | 15 | 15/50 | 30 |
| Particle Diameter[1] (nm) | 20 | 11 | 20/11 | 20/11 |
| DOP ml/100 g | 176.3 | 228.1 | — | 175.6 |
| pH | 6.3 | 6.3 | — | 6.6 |
| Moisture | 5.5 | 5.2 | — | 7.7 |
| Ignition Loss | 9.67 | 8.99 | — | 11.93 |

[1]Silica elementary particle diameter as measured by TEM in nm.

FIG. 1 graphically depicts the pore volume percent and the mercury volume deviation in terms of percent for silica Sample 4.

Figure 2:
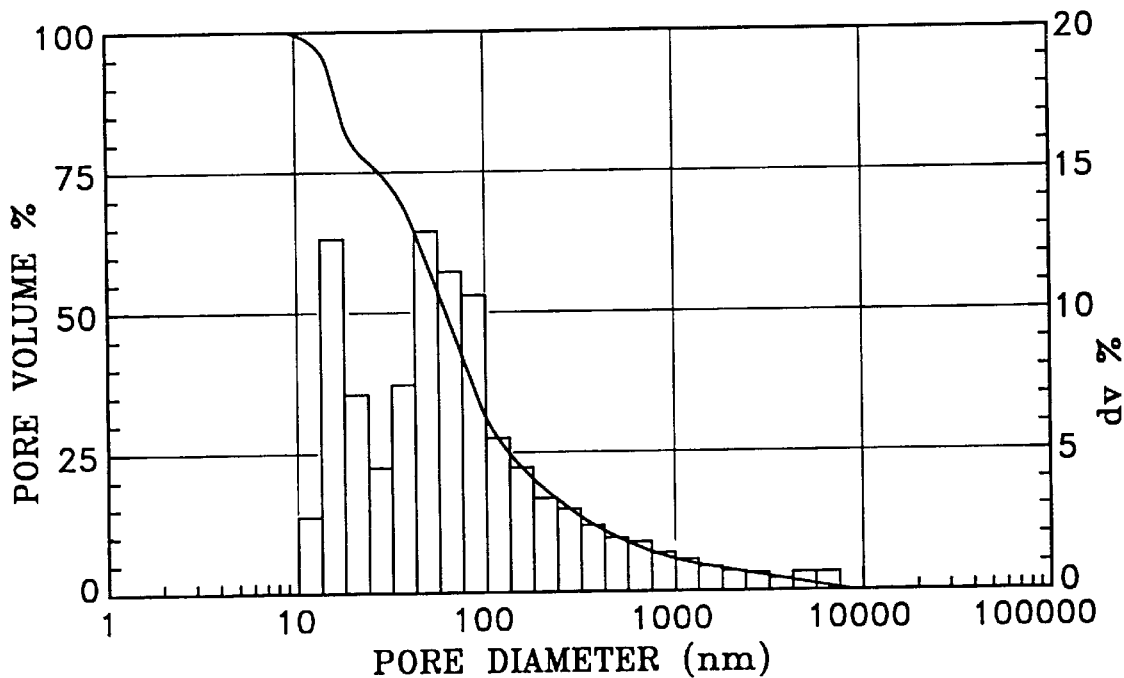
FIG. 2 is a graphical illustration of the pore volume percent and the mercury volume deviation in terms of percent for the multimodal pore size distribution as measured by mechanical blend of silica (Silica 3) used in Example 1.

FIG. 2 graphically depicts the pore volume percent and the mercury volume deviation in terms of percent for the mechanical blend of silica (Sample 3).

PSD max (nm) means identification of pore size distribution maximum measured in nanometers. One number indicates a monomodal distribution whereas two numbers indicate a bimodal distribution.

The above silicas were compounded in the rubber compound of Table II.

TABLE II

| Nonproductive | |
| --- | --- |
| Natural Rubber | 20 |
| Polybutadiene | 30 |
| Styrene-Butadiene Rubber (18.75 parts oil) | 68.75 |
| Waxes | 1.5 |
| Accelerator | 2.0 |
| Stearic Acid | 7.5 |
| Zinc Oxide | 2.5 |
| X50S[1] | Varied |
| Silica | Varied |

| Productive | |
| --- | --- |
| Sulfur | 1.4 |
| Antidegradant[2] | 1.0 |
| Accelerator[3] | Varied |
| Accelerator[4] | Varied |
| Retarder | 0.05 |

[1]A 50/50 blend of bis-(3-triethoxysilylpropyl)tetrasulfide and carbon black
[2]Wingstay ® 100
[3]N-cyclohexyl-2-benzothiazole sulfenamide
[4]Diphenyl guanidine Table III below lists the physical data for the four rubber compounds of Table II.

TABLE III

| Sample | 1 | 2 | 3 | 4 |
| --- | --- | --- | --- | --- |
| Silica 1 | 80 | 0 | 0 | 0 |
| Silica 2 | 0 | 65 | 0 | 0 |
| Silica 3 | 0 | 0 | 80 | 0 |
| Siiica 4 | 0 | 0 | 0 | 80 |
| Accelerator[1] | 1.25 | 1.65 | 1.5 | 1.5 |
| Accelerator[2] | 1.75 | 2.2 | 2.0 | 2.0 |
| X50S | 8.5 | 12.8 | 12.8 | 12.8 |
| Mod 100% (MPa) | 1.9 | 2.6 | 2.5 | 2.25 |
| Mod 300% (MPa) | 9.3 | 9.3 | 10.7 | 10.4 |
| Mod Ratio | 4.9 | 3.6 | 4.3 | 4.6 |
| Elong at Break (%) | 505 | 468 | 443 | 430 |
| TS (MPa) | 17 | 15.3 | 16.2 | 15.3 |
| Rebound 23° C. (%) | 41.2 | 41.6 | 40 | 43.8 |
| Rebound 100° C. | 61.8 | 63 | 62 | 66.6 |
| Shore A Hardness | 59.7 | 66.5 | 66.9 | 62.9 |
| Mooney Viscosity | 29.2 | 45.3 | 41.7 | 37.2 |
| T25 (150° C.) (min) | 7.5 | 7.27 | 7.4 | 7.48 |
| T90 (150° C.) (min) | 13.3 | 17.85 | 14.98 | 12.1 |
| WSA (%) | 0.53 | 15.54 | 5.02 | 4.8 |
| G' 50° C. .75% (MPa) | 2.1 | 3.11 | 3.38 | 2.54 |
| Tan δ 50° C. .75% | 0.125 | 0.137 | 0.161 | 0.114 |
| G' 0° C. .75% (MPa) | 1.85 | 6.27 | 7.19 | 5.18 |
| Tan δ 0° C. .75% | 0.295 | 0.277 | 0.31 | 0.3 |
| G' −20° C. .75% (MPa) | 10.8 | 13.3 | 15.3 | 11.2 |
| Tan δ −20 C. .75% | 0.56 | 0.502 | 0.53 | 0.56 |

[1]N-cyclohexyl-2-benzothiazole
[2]Diphenyl guanidine

As can be seen from Sample 1, use of a silica (Silica 1) with low surface area reduces hysteresis (lower tan delta values at +50° C.) but at the expense of reinforcement values (lower modulus 100 percent and lower G' values). The data from Sample 2 indicates use of a silica with a higher surface area (Silica 2) at a lower loading compensates for some of the detriments associated with Sample 1; however, filler dispersion is affected (WSA % is too high) as well as the related properties (modulus 100 percent and modulus ratio). Use of a physical blend (Silica 3) of Silica 1 and Silica 2 provides an intermediate result in terms of WSA %, modulus ratio and hardness compared to the use of Silica 1 and Silica 2. Use of Silica 4 provides significant improvements over the use of Silica 3 in terms of better dispersion (WSA %), lower modulus 100 percent and G' (1 percent) and higher modulus ratios. Such improved properties indicate a rubber compound having better wear resistance. The properties for Sample 4 also indicate improved rolling resistance and fuel economy when used in a tread of a tire due to reduced hysteresis at high temperature (improved Tan Delta at 50° C. and higher hot rebound). Finally, higher hysteresis at low temperatures of Sample 4 (improved Tan Delta at −20° C. values and higher cold rebound values) is indicative for a better performance on wet skid. Compared to Samples 1 and 2, Sample 4 provides the unique advantage of a low Tan Delta at +50° C. and a high Tan Delta at −20° C. with an acceptable dispersion value compared to Sample 3 which contains a blend of silicas.

EXAMPLE 2

The present example was conducted to compare and contrast silicas for use in the present invention versus mechanical blends or mixtures and single-type silicas. The first Control silica (Silica 1) that was compared was obtained from Rhone-Poulenc as Z1115MP. Silica 1 is a control because, even though it is monomodal (single number for PSD Max), the silica has only one type of aggregate with an elementary particle size of 20 nanometers. The second silica (Silica 2) was also obtained from Rhone Poulenc as Z1165MP. Silica 2 is a control because, even though it is monomodal (single number for PSD Max), the silica has only one type of aggregate with an elementary particle size of 14 nanometers. The third silica (Silica 3) was a 50:50 (weight ratio) mechanical blend of Z1115MP (Silica 1) and Z1165MP (Silica 2). Silica 3 is a control because, even though it has a first aggregate with a particle size of 14 and a second aggregate with a particle size of 20, silica is bimodal. The silica (Silica 4) for use in the present invention was also obtained from Rhone Poulenc. Silica 4 has a first aggregate with a particle size of 14 and a second aggregate with a particle size of 20 and is monomodal. Analytical data for each of these four silicas are listed in Table IV below.

TABLE IV

|  | Silica 1 | Silica 2 | Silica 3 | Silica 4 |
|---|---|---|---|---|
| $N_2$ SSA ($m^2/g$) | 108 | 168 | 140 | 139 |
| Hg SSA ($m^2/g$) | 109.00 | 170 | 141 | 149 |
| V (Hg) ($cm^3/g$) | 1.76 | 1.85 | 1.88 | 1.8 |
| PSD Max (nm) | 55 | 25 | 25/50 | 40 |
| Particle Diameter[1] (nm) | 20 | 14 | 20/14 | 20/14 |
| DOP m 1/100 g | 176.3 | 197 | — | 179.4 |
| pH | 6.3 | 6.5 | — | 6.1 |
| Moisture | 5.5 | 6.3 | — | 5.1 |
| Ignition Loss | 9.67 | 10.62 | — | 9.5 |

[1]Silica elementary particle diameter as measured by TEM in nm.

Figure 3:
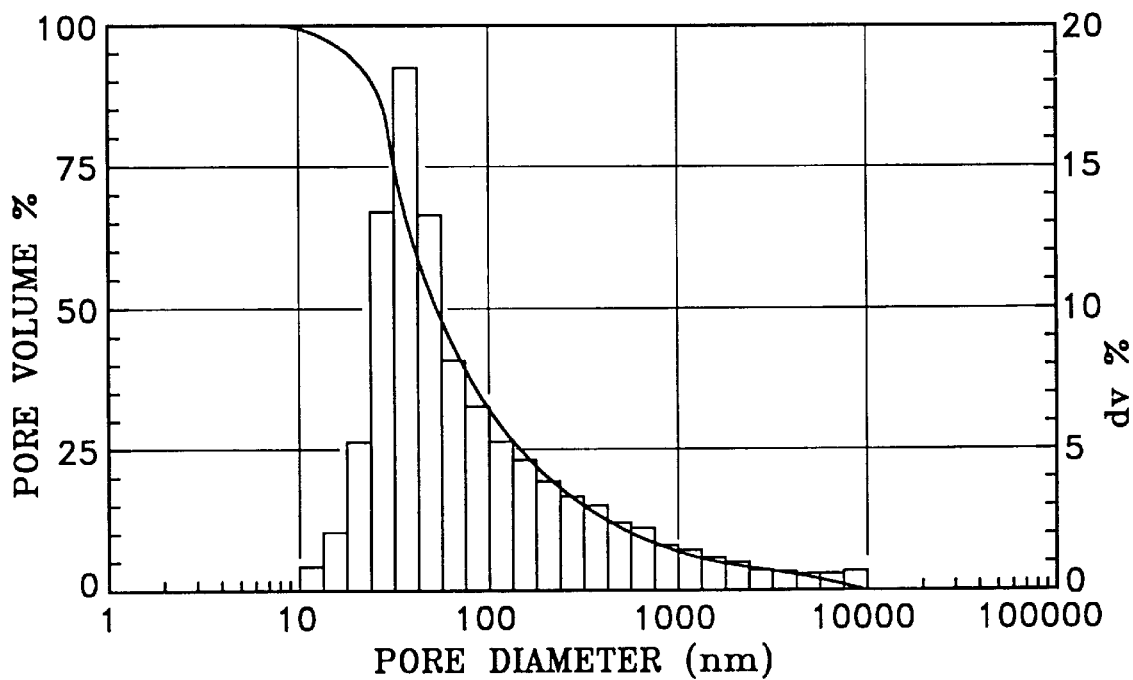
FIG. 3 is a graphical illustration of the pore volume percent and the mercury volume deviation in terms of percent for silica 4 used in Example 2.

FIG. 3 graphically depicts the pore volume percent and the mercury volume deviation in terms of percent for silica Sample 4 of Table IV.

Figure 4:
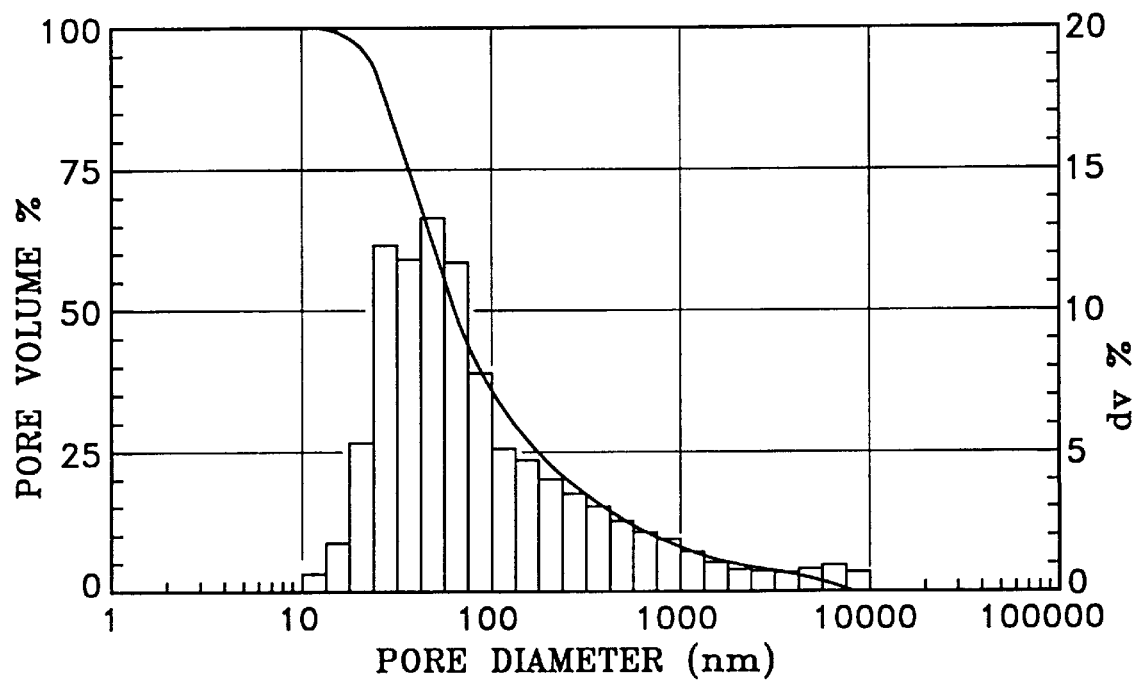
FIG. 4 is a graphical illustration of the pore volume percent and the mercury volume deviation in terms of percent for silica 3 used in Example 2.

FIG. 4 graphically depicts the mercury volume percent and the pore volume deviation in terms of percent for the mechanical blend of silica 3 of Table IV (Sample 3).

The above four silicas were compounded in the rubber compound of Table V listed below.

TABLE V

| Nonproductive | |
|---|---|
| Natural Rubber | 20 |
| Polybutadiene | 30 |
| Styrene-Butadiene Rubber (18.75 parts oil) | 68.75 |
| Waxes | 1.5 |
| Accelerator | 2.0 |
| Stearic Acid | 7.5 |
| Zinc Oxide | 2.5 |
| X50S[1] | Varied |
| Silica | Varied |

| Productive | |
|---|---|
| Sulfur | 1.4 |
| Antidegradant[2] | 1.0 |
| Accelerator[3] | Varied |
| Accelerator[4] | Varied |
| Retarder | 0.05 |

[1]A 50/50 blend of bis-(3-triethoxysilylpropyl)tetrasulfide and carbon black
[2]Wingstay ® 100
[3]N-cyclohexyl-2-benzothiazole sulfenamide
[4]Diphenyl guanidine Table VI below lists the physical data for the four rubber compounds of Table V.

TABLE VI

| Sample | 1 | 2 | 3 | 4 |
|---|---|---|---|---|
| Silica 1 | 80 | 0 | 0 | 0 |
| Silica 2 | 0 | 80 | 0 | 0 |
| Silica 3 | 0 | 0 | 80 | 0 |
| Silica 4 | 0 | 0 | 0 | 80 |
| Accelerator[1] | 1.25 | 1.5 | 1.5 | 1.5 |
| Accelerator[2] | 1.75 | 2.0 | 1.9 | 1.9 |
| X50S | 8.5 | 12.8 | 11.0 | 11.0 |
| Mod 100% (MPa) | 1.9 | 1.9 | 1.9 | 2.0 |
| Mod 300% (MPa) | 9.3 | 8.9 | 10.6 | 11.6 |
| Mod Ratio | 4.9 | 4.7 | 5.6 | 5.8 |
| Elong at Break (%) | 505 | 520 | 423 | 400 |
| TS (MPa) | 17 | 16.9 | 15.3 | 15.2 |
| Rebound 23° C. (%) | 41.2 | 35.4 | 45.6 | 45.8 |
| Rebound 100° C. (%) | 61.8 | 60.2 | 68 | 69 |
| Shore A Hardness | 59.7 | 64 | 59 | 60 |
| Mooney Viscosity | 29.2 | 36 | 31.5 | 30.8 |
| T25 (150° C.) (min) | 7.5 | 7.75 | 6.95 | 6.42 |
| T90 (150° C.) (min) | 13.3 | 14.8 | 10.7 | 9.6 |
| WSA (%) | 0.53 | 0.41 | 0.53 | 0.3 |
| G' 50° C. .75% (MPa) | 2.1 | 2.75 | 2.08 | 3.31 |
| Tan δ 50° C. .75 | 0.125 | 0.159 | 0.13 | 0.121 |
| G' 0° C. .75% (MPa) | 1.85 | 6.35 | 3.92 | 4.57 |
| Tan δ 0° C. .75 | 0.295 | 0.31 | 0.29 | 0.3 |
| G' −20° C. .75% (MPa) | 10.8 | 13.3 | 8.22 | 9.75 |
| Tan δ −20° C. .75 | 0.56 | 0.48 | 0.559 | 0.562 |

[1]N-cyclohexyl-2-benzothiazole
[2]Diphenyl guanidine

As can be seen from Sample 1, use of a silica (Silica 1) with low surface area reduces hysteresis (lower tan delta values at +50° C.) but at the expense of reinforcement values (lower modulus 100 percent and lower G' values). The data from Sample 2 indicates the opposite compromise of silica 1 is obtained. Use of a physical blend (Silica 3) of Silica 1 and Silica 2 provides an intermediate result in terms of properties compared to the use of Silica 1 and Silica 2. Use of Silica 4 provides significant improvements over the use of Silica 3 in terms of better dispersion (WSA %) and higher modulus ratios. Such improved properties indicate a rubber compound having better wear resistance. The properties for Sample 4 also indicate improved rolling resistance and fuel economy when used in a tread of a tire due to reduced hysteresis at high temperature (improved Tan Delta at 50° C. and higher hot rebound). Finally, higher hysteresis at low temperatures of Sample 4 (improved Tan Delta at −20° C. values and higher cold rebound values) is indicative for a better performance on wet skid. Compared to Samples 1 and 2, Sample 4 provides the advantage of a low Tan Delta at +50° C. and a high Tan Delta at −20° C. with an acceptable dispersion value compared to Sample 3 which contains a blend of silicas.

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition containing a filler comprising mixing
   (a) 100 parts by weight of at least one rubber containing olefinic unsaturation; and
   (b) 1 to 250 phr of precipitated silica having first and second aggregates wherein
      (1) said first aggregates are from 10 to 90 weight percent of the overall weight percent of said silica and consist essentially of small particles ranging in size of from 5 to 15 nanometers in diameter;
      (2) said second aggregates are from 90 to 10 weight percent of the overall weight percent of said silica and consist essentially of small particles ranging in size of from 17 to 30 nanometers in diameter; and
      (3) the pore size distribution of the silica, as measured by mercury porosimetry is monomodal.

2. The method of claim 1 wherein said rubber containing olefinic unsaturation is selected from the group consisting of natural rubber and synthetic rubber.

3. The method of claim 2 wherein said synthetic rubber is selected from the group consisting of conjugated diene homopolymers and copolymers and from copolymers of at least one conjugated diene and aromatic vinyl compound.

4. The method of claim 1 wherein a sulfur containing organosilicon compound is present and is of the formula:

$$Z-Alk-S_n-Alk-Z$$

in which Z is selected from the group consisting of $$-\underset{\underset{R^2}{|}}{\overset{\overset{R^1}{|}}{Si}}-R^1, \quad -\underset{\underset{R^2}{|}}{\overset{\overset{R^1}{|}}{Si}}-R^2 \quad \text{and} \quad -\underset{\underset{R^2}{|}}{\overset{\overset{R^2}{|}}{Si}}-R^2$$

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

5. The method of claim 2 wherein sulfur containing organosilicon compound is present in an amount ranging from 0.01 to 1.0 parts by weight per part by weight of the silica.

6. The method of claim 1 wherein said first aggregates range from 15 to 50 weight percent of the overall weight percent of the silica having first and second aggregates.

7. The method of claim 1 wherein said small particles range from 10 to 15 nanometers in diameter.

8. The method of claim 1 wherein said second aggregates range from 50 to 85 weight percent of the overall weight percent of the silica having first and second aggregates.

9. The method of claim 1 wherein said large particles range from 17 to 30 nanometers in diameter.

10. The method of claim 1 wherein said rubber containing olefinic unsaturation is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

11. The method of claim 1 wherein said rubber composition is thermomechanically mixed at a rubber temperature in a range of from 140° C. to 190° C. for a mixing time of from 1 to 20 minutes.

12. A rubber composition containing a silica filler comprising
   (a) 100 parts by weight of at least one rubber containing olefinic unsaturation; and
   (b) 1 to 250 phr of a precipitated silica having first and second aggregates wherein
      (1) said first aggregates are from 10 to 90 weight percent of the overall weight percent of said silica and consist essentially of small particles ranging in size of from 5 to 15 nanometers;
      (2) said second aggregates are from 90 to 10 weight percent of the overall weight percent of silica and consist essentially of small particles ranging in size of from 17 to 30 nanometers in diameter; and
      (3) the pore size distribution of silica, as measured by mercury porosimetry is monomodal.

13. The composition of claim 12 wherein said rubber containing olefinic unsaturation is selected from the group consisting of natural rubber and synthetic rubber.

14. The composition of claim 13 wherein said synthetic rubber is selected from the group consisting of conjugated diene homopolymers and copolymers and from copolymers of at least one conjugated diene and aromatic vinyl compound.

15. The composition of claim 12 wherein said first aggregates range from 15 to 50 weight percent of the overall weight percent of the silica having first and second aggregates.

16. The composition of claim 12 wherein said small particles range from 10 to 15 nanometers in diameter.

17. The composition of claim 12 wherein said second aggregates range from 50 to 85 weight percent of the overall weight percent of the silica having first and second aggregates.

18. The composition of claim 12 wherein said second aggregates range from 17 to 30 nanometers in diameter.

19. The composition of claim 12 wherein said rubber is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

20. The composition of claim 12 wherein said composition is thermomechanically mixed at a rubber temperature in a range of from 140° C. to 190° C. for a total mixing time of from 1 to 20 minutes.

21. The composition of claim 12 wherein a sulfur containing organosilicon compound is present and is of the formula:

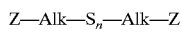

in which Z is selected from the group consisting of

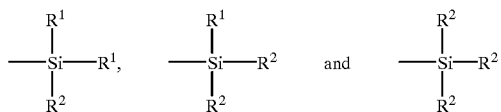

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

22. The composition of claim 21 wherein said sulfur containing organosilicon compound is present in an amount ranging from 0.01 to 1.0 parts by weight per part by weight of said silica.

23. A sulfur vulcanized rubber composition which is prepared by heating the composition of claim 12 to a temperature ranging from 100° C. to 200° C. in the presence of a sulfur vulcanizing agent.

24. The rubber composition of claim 23 in the form of a tire, belt or hose.

25. A tire having a tread comprised of the composition of claim 23.

* * * * *